United States Patent [19]

Gluntz

[11] Patent Number: 5,511,102
[45] Date of Patent: Apr. 23, 1996

[54] APPARATUS FOR DRAINING LOWER DRYWELL POOL WATER INTO SUPPRESION POOL IN BOILING WATER REACTOR

[75] Inventor: Douglas M. Gluntz, San Jose, Calif.

[73] Assignee: General Electric Company, San Jose, Calif.

[21] Appl. No.: 404,227

[22] Filed: Mar. 15, 1995

[51] Int. Cl.⁶ .................................................. G21C 15/18
[52] U.S. Cl. .................................................. 376/283
[58] Field of Search .......................... 376/283, 298, 376/299, 282

[56] References Cited

U.S. PATENT DOCUMENTS 5,295,168  3/1994  Gluntz et al. ..................... 376/283

FOREIGN PATENT DOCUMENTS 61-32637  7/1986  Japan ............................ 376/283

*Primary Examiner*—Daniel D. Wasil
*Attorney, Agent, or Firm*—James E. McGinness

[57] ABSTRACT

An apparatus which mitigates temperature stratification in the suppression pool water caused by hot water drained into the suppression pool from the lower drywell pool. The outlet of a spillover hole formed in the inner bounding wall of the suppression pool is connected to and in flow communication with one end of piping. The inlet end of the piping is above the water level in the suppression pool. The piping is routed down the vertical downcomer duct and through a hole formed in the thin wall separating the downcomer duct from the suppression pool water. The piping discharge end preferably has an elevation at or near the bottom of the suppression pool and has a location in the horizontal plane which is removed from the point where the piping first emerges on the suppression pool side of the inner bounding wall of the suppression pool. This enables water at the surface of the lower drywell pool to flow into and be discharged at the bottom of the suppression pool.

14 Claims, 3 Drawing Sheets

5,511,102

APPARATUS FOR DRAINING LOWER DRYWELL POOL WATER INTO SUPPRESION POOL IN BOILING WATER REACTOR

The Government of the United States of America has rights in this invention in accordance with Contract No. DE-AC03-90SF18494 awarded by the Department of Energy.

FIELD OF THE INVENTION

This invention relates generally to accident-response systems used to control and mitigate the various adverse effects of loss-of-coolant accidents in boiling water reactor (BWR) type nuclear power stations. In particular, the invention relates to passive systems for delivering and mixing high-temperature water overflowing from the lower drywell pool into the cooler waters of the suppression pool in the containment of certain advanced-design BWRs following a break in the reactor coolant pressure boundary.

BACKGROUND OF THE INVENTION

BWRs have conventionally utilized active safety systems to control and mitigate accident events. Those events varied from small break to design basis accidents. Passive safety systems have been studied for use in simplified BWRs (SBWRs) because of their merits in reducing specialized maintenance and surveillance testing of the safety-related equipment, and in eliminating the need for AC power, thereby improving the reliability of essential safety system responses necessary for the control and mitigation of adverse effects produced by accidents. SBWRs can additionally be designed with certain passive safety features that provide more resistance to human error in accident control and mitigation.

Referring to FIG. 1, an SBWR includes a reactor pressure vessel 10 containing a nuclear reactor fuel core 12 submerged in water 14. The fuel core heats the water to generate steam 14a which is discharged from the reactor pressure vessel through a main steam line 16 and used to power a steam turbine-generator for producing electrical power.

The reactor pressure vessel is surrounded by a containment vessel 18. The volume inside containment vessel 18 and outside reactor pressure vessel 10 forms the drywell 20. The containment vessel is a concrete structure having a steel liner and is designed to withstand elevated pressure inside the drywell, which typically contains a noncondensable gas such as nitrogen.

In accordance with the conventional SBWR containment design, an annular suppression or wetwell pool 22 surrounds the reactor pressure vessel within the containment vessel. The suppression pool is partially filled with water 24 to define a wetwell airspace or plenum 26 thereabove. The suppression pool 22 serves various functions including being a heat sink in the event of certain accidents. For example, one type of accident designed for is a loss-of-coolant accident (LOCA) in which steam from the reactor pressure vessel 10 leaks into the drywell 20. Following the LOCA, the reactor is shut down but pressurized steam and residual decay heat continue to be generated for a certain time following the shutdown. Steam escaping into the drywell 20 is channeled into the suppression pool 22 through a multiplicity of (e.g., eight) vertical downcomer ducts distributed at respective azimuthal positions along the inboard bounding wall 74 of the suppression pool. Each downcomer duct 27 communicates with a plurality of (e.g., three) horizontal vents 28. Steam channeled into suppression pool 22 through vents 28 carries with it portions of the drywell noncondensable gas 30. The steam is condensed and the noncondensable gas 30 is buoyed upwardly to the wetwell plenum 26, where it accumulates.

When the pressure in wetwell plenum 26 exceeds that in drywell 20, one or more vacuum breakers 36, which penetrate the wetwell wall, are opened to allow noncondensable gas 30 in the wetwell plenum 26 to vent to the drywell 20. The vacuum breakers 36 remain closed when the pressure in drywell 20 is equal to or greater than the pressure in the wetwell plenum 26.

The system further includes one or more gravity-driven cooling system (GDCS) pools 38 located above the suppression pool 22 within the containment vessel 18. The GDCS pool 38 is partially filled with water 42 to define a GDCS plenum 44 thereabove. The GDCS pool 38 is connected to an outlet line 46 having a valve 48 which is controlled by controller 40. The valve 48 is opened to allow GDCS water 42 to drain by gravity into pressure vessel 10 for cooling the core following a LOCA. Steam and noncondensable gas can be channeled directly into the GDCS plenum 44 from the drywell 20 via an inlet 50. An optional condenser or heat exchanger 72 may be provided for condensing steam channeled through inlet 50 following draining of the GDCS water 42 for drawing in additional steam and noncondensable gas.

The suppression pool 22 is disposed at an elevation which is above the core 12 and is connected to an outlet line 32 having a valve 34 which is controlled by a controller 40. The valve 34 is opened after an appropriate time delay from the opening of valve 48 to allow wetwell water 24 to also drain by gravity into the pressure vessel 10 for cooling the core following a LOCA.

In the SBWR design, a passive containment cooling system (PCCS) is provided for removing heat from the containment vessel 18 during a LOCA. A condenser pool 52, configured as a collection of subpools (not shown) interconnected so as to act as a single common large pool, is disposed above the containment vessel 18 and above the GDCS pool 38. The condenser pool 52 contains a plurality of PCC heat exchangers 54 (only one of which is shown in FIG. 1), also commonly referred to as PCC condensers, submerged in isolation water 56. The condenser pool 52 includes one or more vents 58 to atmosphere outside the containment for venting the airspace above the condenser pool water 56 for discharging heat therefrom upon use of the PCC heat exchanger 54.

The PCC heat exchanger 54 has an inlet line 60 in flow communication with the drywell 20 and an outlet line 62 joined to a collector chamber 64 from which a vent pipe 66 extends into the suppression pool 22 and a condensate return conduit 68 extends into the GDCS pool 38. The PCC heat exchanger 54 provides passive heat removal from the drywell 20 following the LOCA, with steam released into the drywell flowing through inlet 60 into the PCC heat exchanger wherein it is condensed. The noncondensable gas (e.g., nitrogen) within the drywell is carried by the steam into the PCC heat exchanger and must be separated from the steam to provide effective operation of the PCC heat exchanger. The collector chamber 64 separates the noncondensable gas from the condensate, with the separated noncondensable gas being vented into the suppression pool 22, and the condensate being channeled into the GDCS pool 38. A water trap or loop seal 70 is provided at the end of condensate return conduit 68 in GDCS pool 38 to restrict backflow of heated fluids from GDCS pool 38 to suppression pool 22 via the condensate return conduit 68, which would bypass PCC heat exchanger 54.

Accordingly, this system is configured to transport the noncondensable gas from the drywell 20 to the wetwell plenum 26 and then condense steam from the drywell in the PCC heat exchanger 54. The noncondensable gas will remain in the enclosed wetwell until the PCC heat exchanger 54 condenses steam faster than it is released from the reactor pressure vessel. When this occurs, the PCC heat exchanger lowers the drywell pressure below that of the wetwell, which causes the vacuum breakers 36 to open, thereby allowing noncondensable gas stored in the wetwell to return to the drywell.

Furthermore, the noncondensable gas within the drywell is also carried directly into the wetwell by the escaping steam which is channeled through horizontal vents 28. The steam is released underwater in the wetwell and condenses therein, while the noncondensable gas is buoyed upwardly through the pool water to vent into the enclosed wetwell air chamber disposed above the pool water, where the noncondensable gas is retained. As the noncondensable gas accumulates in the wetwell chamber, the pressure therein increases correspondingly.

The SBWR depicted in FIG. 1 is further provided with spillover holes 80 which allow the annular region 84 (the region between the reactor pressure vessel 10 and the structural wall concentric to the RPV comprising the inboard bounding wall 74 to the suppression pool 22) to communicate with the drywell/wetwell vertical downcomer ducts 27. During the course of many LOCAs to which the SBWR and its European variant, the ESBWR, are subject, water entering the lower drywell via the postulated unisolatable break of the reactor coolant pressure boundary will collect over several hours, forming a pool in which the upper surface is continually rising. Eventually, the pool surface reaches the spillover holes 80, via which all further water additions to this lower drywell pool are drained out into the downcomer ducts 27. The ducts 27 in turn lead to the horizontal vents 28a–c of the "horizontal vent system".

From the point of connection of spillover holes into the vertical downcomer ducts, emerging water falls downward onto a column of standing water in the duct. With the arrival of such water additions, a displacement action occurs in which like amounts of water are passed by passive action through the topmost of these horizontal vents, to enter the suppression pool 22 itself. The emergency core cooling system of the BWR then provides other means (e.g., conduit 32 and valve 34) for returning suppression pool water to the reactor to supply endless cooling to the reactor core.

The problem which arises in some of these accident scenarios is that the uppermost layer of the containment's lower drywell pool comes, by natural process of buoyancy, to contain the very hottest water within the entire bulk of the lower drywell pool. Accordingly, the water passing through the spillover holes 80 is typically relatively hot water—in fact, quite possibly the hottest water anywhere inside the containment. Thus, this hot water soon makes up the standing column of water in each vertical downcomer duct and, in short order, such relatively hot water is the characteristic of the water delivered through the topmost of the horizontal vents 28a–c into the suppression pool. Once such hot water enters the suppression pool, it has a natural tendency to form an upwardly moving plume which mixes somewhat with suppression pool water while rising. When the plume reaches the suppression pool water surface, the hot/warm water forming the plume spreads out over the entire top layer of the suppression pool water and, over time, develops a hot/warm, stratified layer right at the upper surface of the suppression pool water.

The development of such a hot stratified layer has an undesirable consequence in the wetwell airspace 26, because this entire airspace takes on, over time, a vapor partial pressure that is in close equilibrium with the partial pressure of the suppression pool surface layer. Hot layers have higher vapor partial pressures than colder layers have. The contribution of an elevated water vapor pressure in the wetwell to the total gas pressure therein is a key determinant of the total pressure loading which the containment structure must be designed to withstand. Thus, there is a need for means for mitigating the extent of temperature stratification otherwise produced by the conventional spillover hole configuration and "horizontal vent system" design for the SBWR and ESBWR.

SUMMARY OF THE INVENTION

The present invention is an apparatus which mitigates temperature stratification in the suppression pool water caused by hot water drained into the suppression pool from the lower drywell pool. In accordance with one preferred embodiment, the outlet of a spillover hole formed in the inner bounding wall of the suppression pool is connected to and in flow communication with one end of piping. The upper surface of the suppression pool water lies below the elevation of the spillover hole, i.e., below the elevation of the inlet end of the piping. The piping is routed down the vertical downcomer duct and through a hole formed in the thin wall separating the downcomer duct from the suppression pool water. The piping discharge point preferably has an elevation at or near the bottom of the suppression pool and has a location in the horizontal plane which is removed from the point where the piping first emerges on the suppression pool side of the inner bounding wall of the suppression pool.

In this configuration, the hot water passing through the spillover holes is first constrained to enter the suppression pool at a deeper discharge point, so that the resultant hot water plume which originates at this discharge point has a much longer path before reaching the suppression pool water surface. As a result of this longer path, the plume will undergo much more complete mixing, so that the temperature of the fluid reaching the suppression pool water surface will be cooler. Secondly, by having a discharge point appropriately distanced (in routing pathway) from the point of piping entry into the suppression pool, heat transfer from the hot water flowing through the piping will be occurring all along the piping run. This being the case, the temperature of the water issuing from this apparatus' discharge point will be lower than the temperature of the water overflowing into the spillover hole. As a result, the temperature of the plume will be further reduced by the time it arrives at the upper surface of the suppression pool water.

DETAILED DESCRIPTION OF THE PREFERRED EMBODIMENTS

Figure 1:
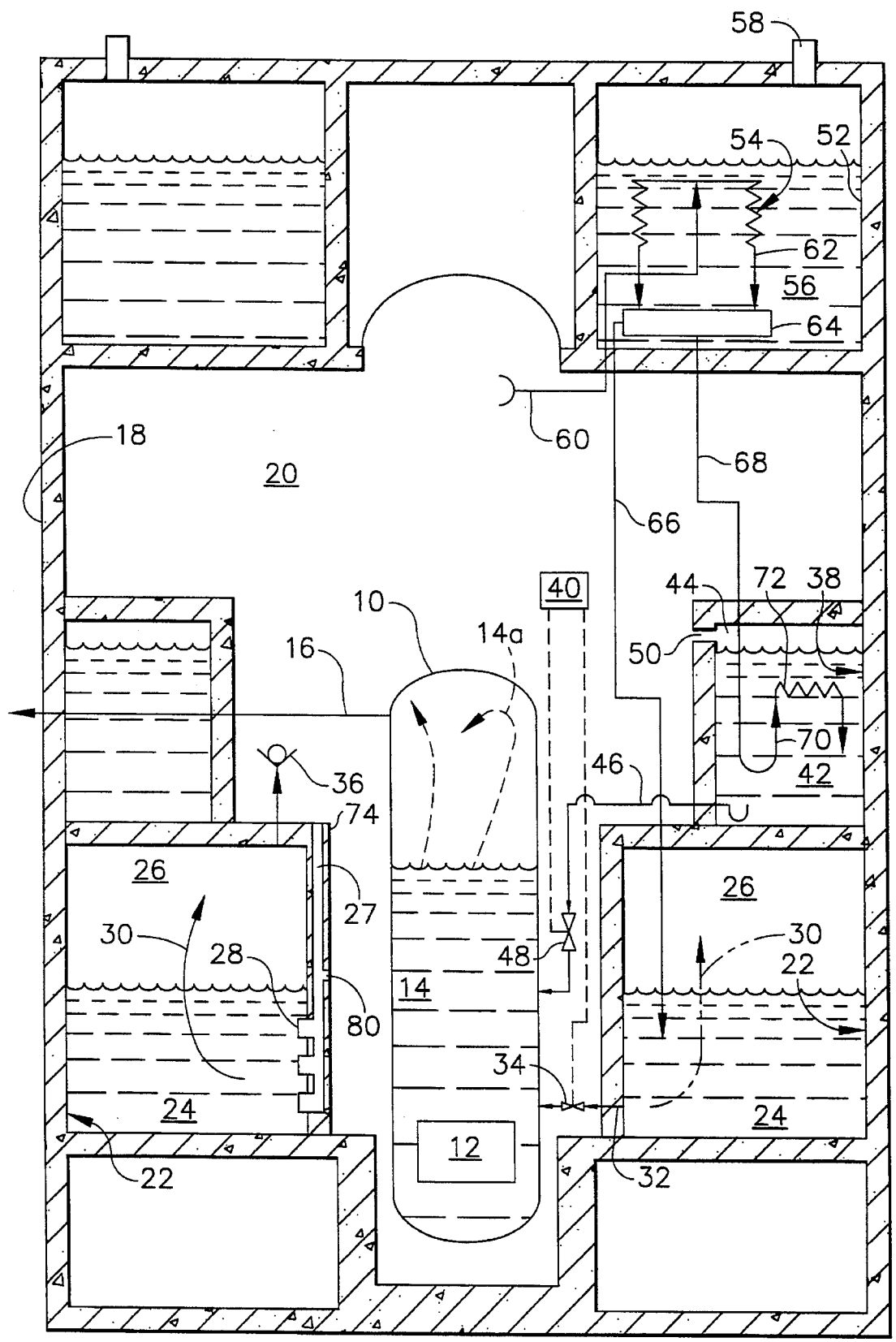
FIG. 1 is a schematic elevational sectional view of a nuclear reactor having a pressure suppression system in accordance with a known SBWR design.
Figure 2:
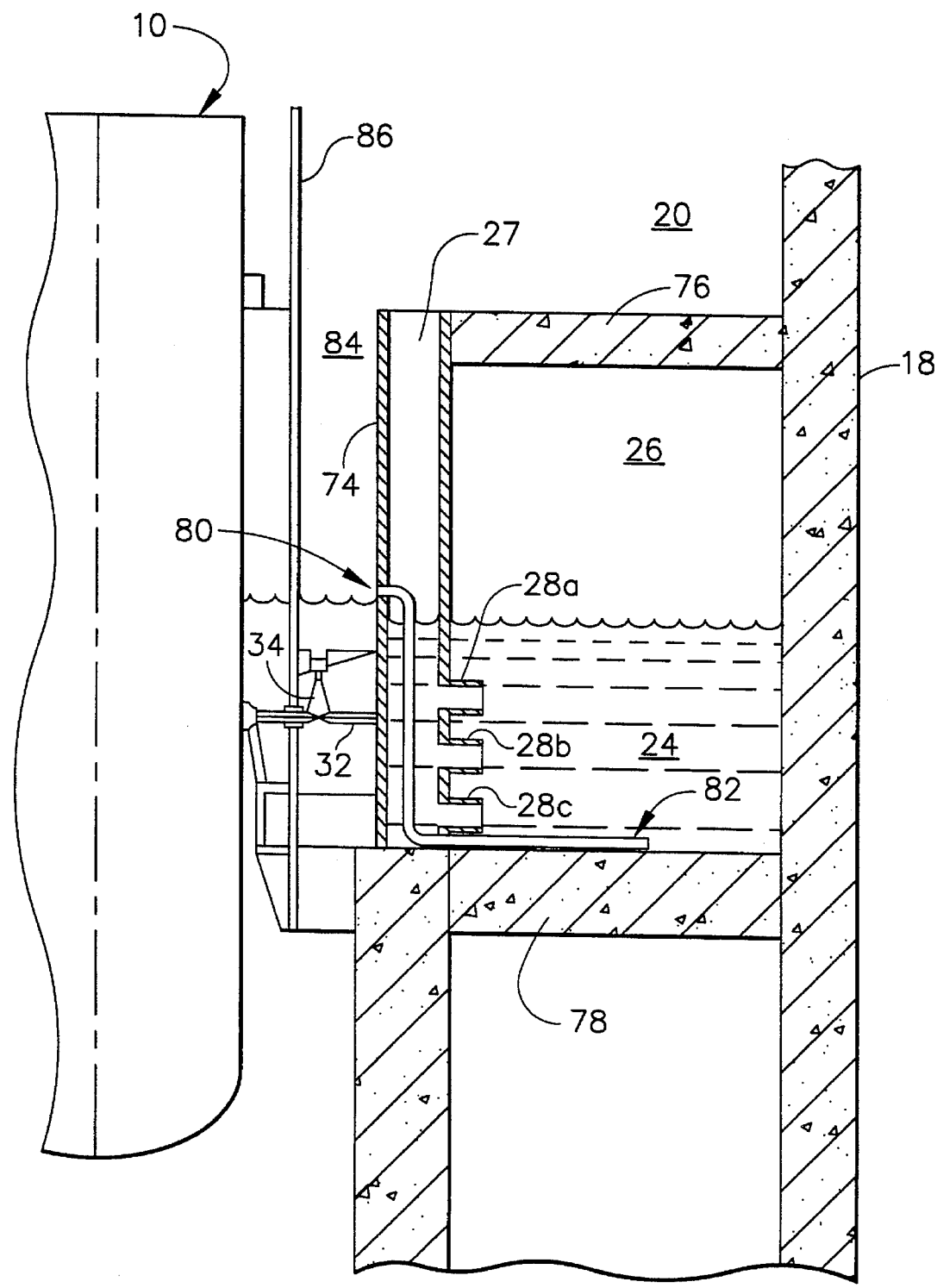
FIG. 2 is a schematic elevational sectional view of a spillover hole in accordance with a preferred embodiment of the invention.

In accordance with the preferred embodiment of the present invention, piping 82 is installed as shown in FIG. 2 for routing hot water to the bottom of the suppression pool 22. The suppression pool is formed by an annular diaphragm floor 76, an annular base floor 78, a circular cylindrical inner bounding wall 74 and the circular cylindrical wall of the containment vessel 18. The diaphragm floor 76 is supported by inner bounding wall 74 and containment vessel 18. The inner bounding wall 74 has a multiplicity of (e.g., eight) vertical downcomer ducts 27 distributed at respective azimuthal positions about the centerline of the reactor. The top of each downcomer duct 27 communicates with the drywell 20 at the top of the inner bounding wall 74; the lower portions of each downcomer duct 27 communicate with a plurality of (e.g., three) horizontal vents 28a–c which outlet into the suppression pool. Each downcomer duct also communicates with the annular region 84 located between the shield wall 86 and the bounding wall 74 via a respective spillover hole 80. The spillover hole is located at an appropriate elevation above the designed water level inside the suppression pool 22. One end of piping 82 is connected to the bounding wall 74 such that piping 82 is in flow communication with the spillover hole 80. The other end of piping 82 preferably discharges into the suppression pool at or near the base floor 78 of the suppression pool. However, the benefit of the present invention can be attained, albeit to a lesser degree, even if the discharge point of the piping 82 lies at an elevation above the base floor 78, as long as the piping discharge point is lower than the uppermost horizontal vent 28a. The piping is routed down the vertical downcomer duct 27 and into the suppression pool via a hole in the thin wall separating the downcomer duct and the suppression pool water. As seen in FIG. 2, the piping 82 discharges at an elevation which is at or near the bottom of the suppression pool. In this configuration, the hot water passing through the spillover hole 80 from the lower drywell pool 84 is constrained to enter the suppression pool at a deeper discharge point, so that the hot water plume rising from the end of the piping is caused to have a much longer upward path before reaching the upper surface of the suppression pool water 24. As a result of this longer path, the plume will undergo much more complete mixing, so that the temperature of the fluid reaching the suppression pool water surface will be cooler.

In addition, the piping 82 is extended so that the discharge point is horizontally displaced relative to the point where the piping first emerges on the suppression pool side of the inner bounding wall 74. Preferably the piping discharge is located near the midline of the suppression pool. In its simplest form, the lower horizontal leg of piping 82 extends radially. However, the lower horizontal leg of piping 82 need not be directed radially and may further have a sinuous or other nonlinear shape. The increased flowpath provides additional time for heat transfer from the hot water inside the piping 82 to the suppression pool water 24. Similarly, the vertical leg of piping 82 may have a sinuous or other nonlinear shape conducive to increased heat transfer. By having the piping discharge point appropriately distanced (in routing pathway) from the point of piping entry into the suppression pool, heat transfer from the hot water flowing through the piping will be occurring all along the piping run. This being the case, the temperature at the discharge point will be lower than the temperature in the spillover hole. As a result, the temperature of the plume will be further reduced by the time it arrives at the upper surface of the suppression pool water.

Figure 3:
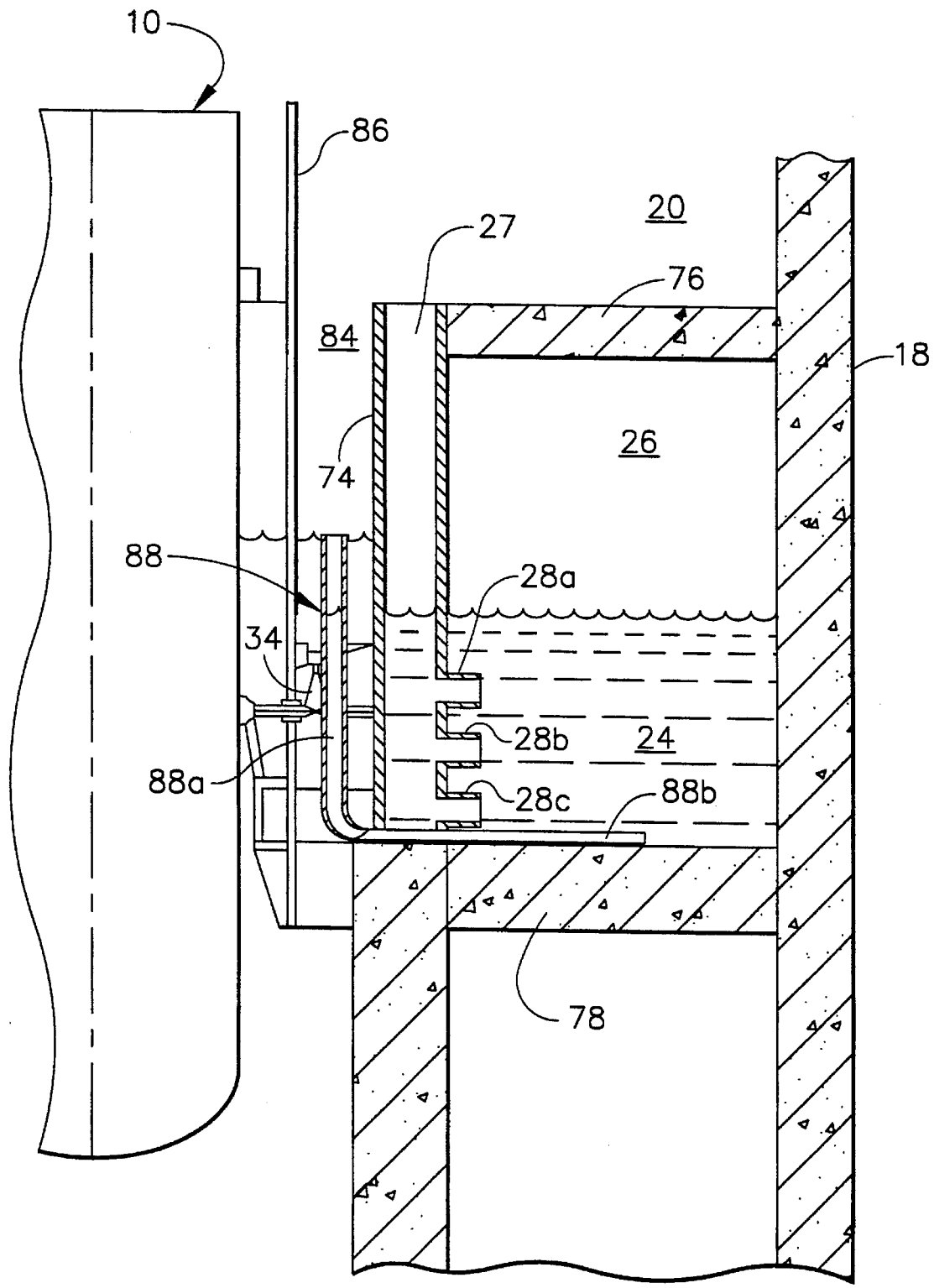
FIG. 3 is a schematic elevational sectional view of a standpipe arrangement in accordance with an alternative preferred embodiment of the invention.

A variation on the concept of the invention is to eliminate the spillover holes and simply produce the effect of spillover holes via a standpipe arrangement installed within the lower drywell. As seen in FIG. 3, piping 88 comprises a vertical standpipe 88a located between the shield wall 86 and the inner bounding wall 74, and a horizontal leg 88b which penetrates the thin walls on opposing sides of the downcomer duct 27. In accordance with this arrangement, the top of standpipe 88a is positioned at the same elevation as that of the previously described spillover holes. If standpipes are used, then the spillover holes are superfluous. The routing for horizontal leg 88b inside the suppression pool 22 can be similar to that described above with reference to FIG. 2.

When the water level inside the flooded lower drywell rises above the top of standpipe 88a, the water at a level above the rim of the standpipe inlet will drain down into the standpipe. Under this condition, the lower drywell pool has a water level higher than the water level inside the suppression pool. Therefore, the difference in pressure will push the lower drywell pool water through piping 88, out the discharge end of horizontal leg 88b and into the bottom of the suppression pool. Thus, a standpipe arrangement provides the same enhanced heat transfer effect as that of the improved spillover hole arrangement as long as the discharge point for the respective embodiments is the same. In addition, the effects produced in the standpipe variation ensure that the pipe routing will not present a heating (via heat transfer through the pipe as it wends its way downward through the vertical downcomer ducts) to the standing water column within the downcomer ducts.

Another variation is to use means for increasing heat transfer, e.g., finned surfaces, on the piping wending its way to the discharge point within the suppression pool. The use of finned surfaces or similar devices further spreads out the heat transfers to the suppression pool, mitigating still further the temperature of the discharge plume arriving at the upper surface of the suppression pool water.

A further variation is to employ a distribution header and branch discharge points from the piping at the suppression pool bottom. By making a given discharge smaller, and spreading out the larger number of discharges over a wider area, the temperature of any given plume when it arrives at the upper surface of the suppression pool water will be reduced.

The foregoing preferred embodiments have been disclosed for the purpose of illustration. Other variations and modifications will be apparent to persons skilled in the design of passive pressure suppression systems. All such variations and modifications are intended to be encompassed by the claims hereinafter.

I claim:

1. A system for draining water from the drywell into the suppression pool in a boiling water reactor, comprising a conduit having a closed portion which follows a path in a vertical downcomer duct formed in an inner bounding wall of the suppression pool, said conduit comprising:

an inlet in flow communication with the drywell and an outlet in flow communication with the suppression pool, said inlet being at an elevation higher than the water level in the suppression pool and said outlet being near the bottom of the suppression pool, and said closed portion of said conduit comprising:

a downcoming first portion in flow communication with said inlet and a generally horizontal second portion in flow communication with said first portion and said outlet, whereby the surface water in a lower drywell pool flows into the lowermost stratum of water in the suppression pool.

2. The system as defined in claim 1, wherein said inlet of said conduit is connected to a spillover hole formed in a vertical wall which separates the drywell and the vertical downcomer duct, said downcoming first portion of said conduit being located inside the downcomer duct.

3. A system for draining water from the drywell into the suppression pool in a boiling water reactor, comprising a conduit having an inlet in flow communication with the drywell and an outlet in flow communication with the suppression pool, said conduit comprising a downcoming portion in flow communication with said inlet and a generally horizontal portion in flow communication with said downcoming portion and with said outlet, wherein said downcoming portion of said conduit comprises a vertical standpipe located inside the drywell.

4. The system as defined in claim 3, wherein said inlet comprises an open end of said standpipe.

5. A boiling water reactor comprising a containment vessel, a reactor pressure vessel arranged inside said containment vessel so that a lower portion of said reactor pressure vessel is surrounded by a lower drywell pool, a nuclear fuel core arranged inside said reactor pressure vessel, a suppression pool arranged inside said containment vessel and surrounding said reactor pressure vessel with an annular volume of said lower drywell pool therebetween, said suppression pool comprising an inner bounding wall, a vertical downcomer duct formed in said inner bounding wall, and passive means for conveying surface water from said lower drywell pool into the lowermost stratum of water in said suppression pool when the water level in said lower drywell pool is higher than the water level in said suppression pool, said passive means comprising an inlet in flow communication with said lower drywell pool, an outlet in flow communication with said lowermost stratum of water in said suppression pool, and a closed portion connecting said inlet and said outlet and following a path through the vertical downcomer duct.

6. The boiling water reactor as defined in claim 5, wherein said closed portion of said passive means comprises a downcoming first pipe in flow communication with said inlet and a generally horizontal second pipe in flow communication with said first pipe and said outlet.

7. The boiling water reactor as defined in claim 6, wherein said inlet is connected to a spillover hole formed in a vertical wall which separates said lower drywell pool and said downcomer duct, said downcoming first pipe being located inside said downcomer duct.

8. A boiling water reactor comprising a containment vessel, a reactor pressure vessel arranged inside said containment vessel so that a lower portion of said reactor pressure vessel is surrounded by a lower drywell pool, a nuclear fuel core arranged inside said reactor pressure vessel, a suppression pool arranged inside said containment vessel and surrounding said reactor pressure vessel with an annular volume of said lower drywell pool therebetween, and a conduit for conveying surface water from said lower drywell pool into the lowermost stratum of water in said suppression pool when the water level in said lower drywell pool is higher than the water level in said suppression pool, wherein said conduit comprises a generally vertical standpipe located inside said lower drywell pool and having an inlet in flow communication with the lower drywell pool, and a generally horizontal pipe having an outlet in flow communication with the suppression pool, said generally horizontal pipe being in flow communication with said generally vertical standpipe.

9. The system as defined in claim 8, wherein said inlet comprises an open end of said standpipe.

10. A system for draining water into a suppression pool of a boiling water reactor from an annular space between the suppression pool and a reactor pressure vessel, comprising a conduit having an inlet located in the annular space at an elevation above a water level in the suppression pool and an outlet located in the suppression pool at an elevation below the water level in and near the bottom of the suppression pool, said conduit being closed between said inlet and said outlet.

11. The system as defined in claim 10, wherein said conduit comprises a generally vertical standpipe located in the annular space and a generally horizontal pipe in flow communication with said standpipe.

12. The system as defined in claim 11, wherein said inlet comprises an open end of said standpipe.

13. The system as defined in claim 10, wherein said conduit comprises a generally vertical pipe located in a vertical downcomer duct formed in an inner bounding wall of the suppression pool and a generally horizontal pipe in flow communication with said vertical pipe.

14. The system as defined in claim 13, wherein said inlet comprises a spillover hole formed in a wall separating the vertical downcomer duct and the annular space.

* * * * *

UNITED STATES PATENT AND TRADEMARK OFFICE
CERTIFICATE OF CORRECTION

PATENT NO. : 5,511,102
DATED : Apr. 23, 1996
INVENTOR(S) : Douglas M. Gluntz

It is certified that error appears in the above-indentified patent and that said Letters Patent is hereby corrected as shown below:

In col. 1, line 7, insert --no-- before "rights", insert a period after "invention", and delete "in accordance with Contract No."; and delete lines 8 and 9 in their entirety.

Signed and Sealed this

Sixteenth Day of July, 1996

Attest:

BRUCE LEHMAN

Attesting Officer          Commissioner of Patents and Trademarks